United States Patent [19]

Regalbuto et al.

[11] Patent Number: 4,559,890
[45] Date of Patent: Dec. 24, 1985

[54] MOORING RELEASE APPARATUS AND METHOD

[75] Inventors: John A. Regalbuto; Glenn B. Christopher, both of Forth Worth, Tex.

[73] Assignee: Jet Research Center, Inc., Arlington, Tex.

[21] Appl. No.: 487,936

[22] Filed: Apr. 25, 1983

[51] Int. Cl.$^4$ .............................................. B63B 21/24
[52] U.S. Cl. ................... 114/230; 114/221 R; 89/1.14; 148/9 R; 266/48
[58] Field of Search ........... 114/294, 297, 230, 221 A; 266/48, 902, 71; 102/335, 377, 378; 148/9 C, 9 R; 89/1 B; 441/2; 59/86, 93

[56] References Cited

U.S. PATENT DOCUMENTS

| | | | |
|---|---|---|---|
| 3,526,394 | 9/1970 | Howell, Jr. | 59/86 |
| 3,530,759 | 9/1970 | Francis | 89/1 B |
| 3,713,636 | 1/1973 | Helms | 266/23 NN |
| 3,744,369 | 7/1973 | Marziano et al. | 89/1 B |
| 3,961,592 | 6/1976 | Corgnet | 114/294 |
| 4,148,257 | 4/1979 | Orrill et al. | 102/24 HC |
| 4,158,322 | 6/1979 | Hardesty | 89/1 B |

Primary Examiner—Galen L. Barefoot
Assistant Examiner—Edwin L. Swinehart
Attorney, Agent, or Firm—Joseph A. Walkowski; Thomas R. Weaver

[57] ABSTRACT

An apparatus and method having particular utility in quickly releasing the moorings of large vessels and offshore platforms. The preferred embodiment of the apparatus comprises a pair of pyrotechnic cutting torches disposed in a housing included as a structural member in a submerged mooring, such as an anchor chain. The housing divides at one end into a shackle comprising substantially parallel laterally spaced walls, each having an aperture therethrough. A common anchor chain link is inserted between the walls of the shackle and a shackle pin is inserted through the wall apertures and the link to secure the link to the housing. The cutting torches are disposed in the same plane as the link, and the torch nozzles oriented so as to sever the link on both sides of the pin when the torches are ignited, in order to release the chain therefrom. The other end of the housing comprises a clevis, secured to the anchor chain by a Kenter shackle. Torch ignition is actuated by an acoustic control system commanded from a remote location.

15 Claims, 14 Drawing Figures

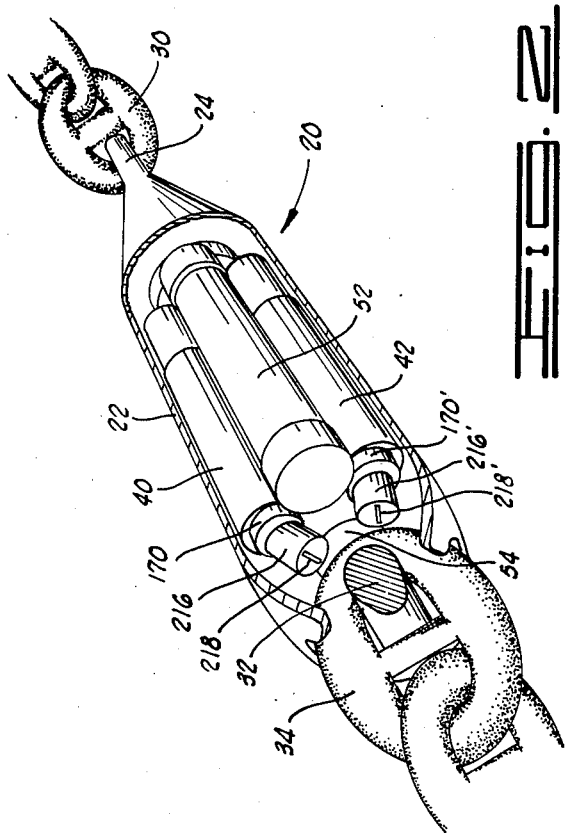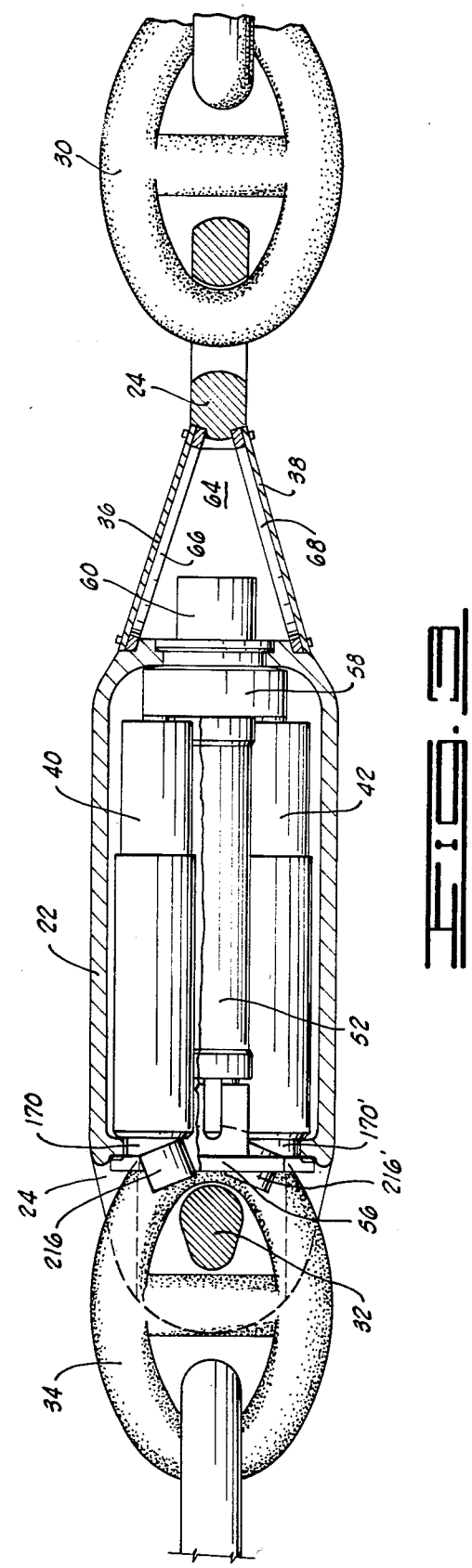

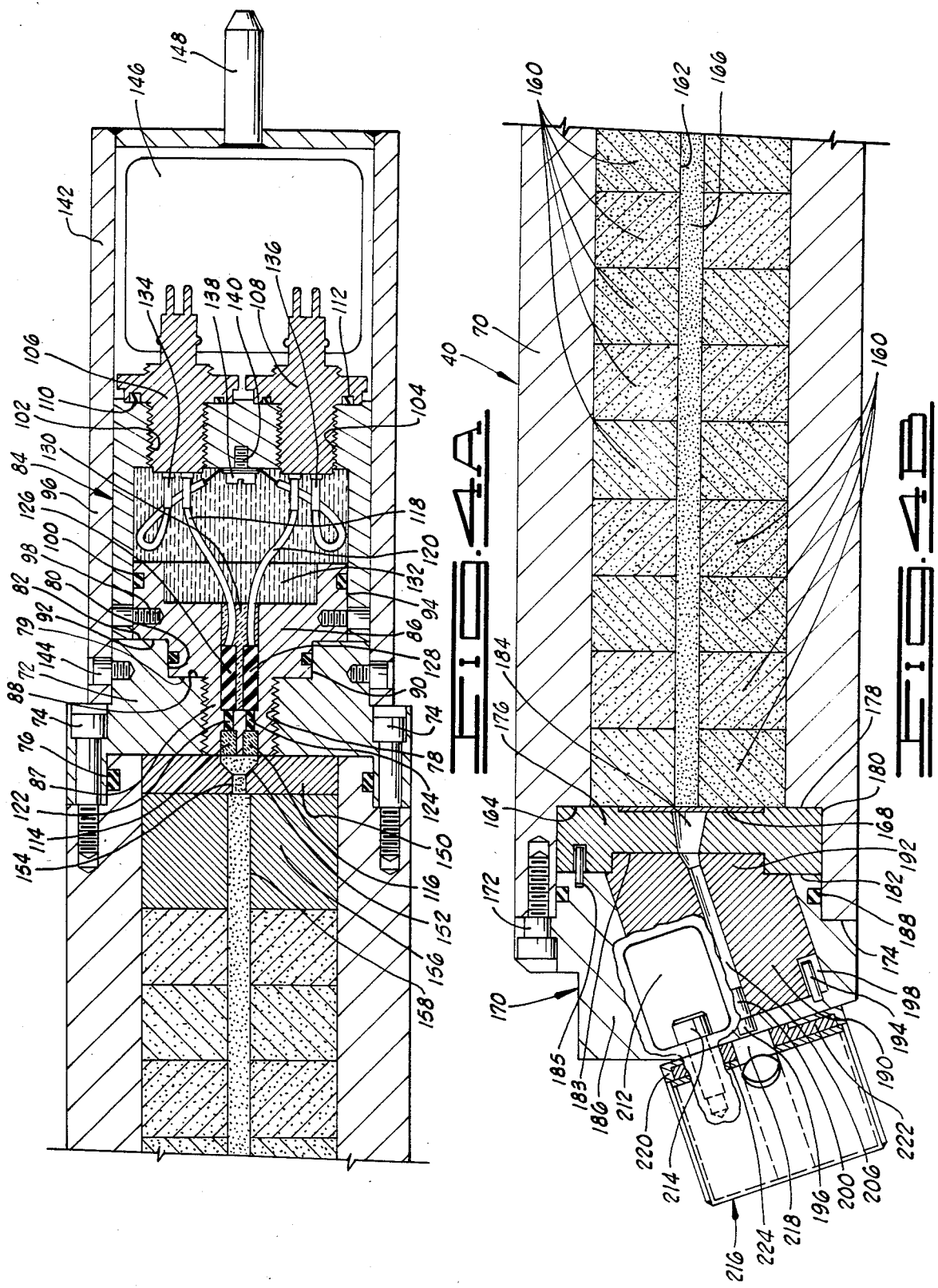

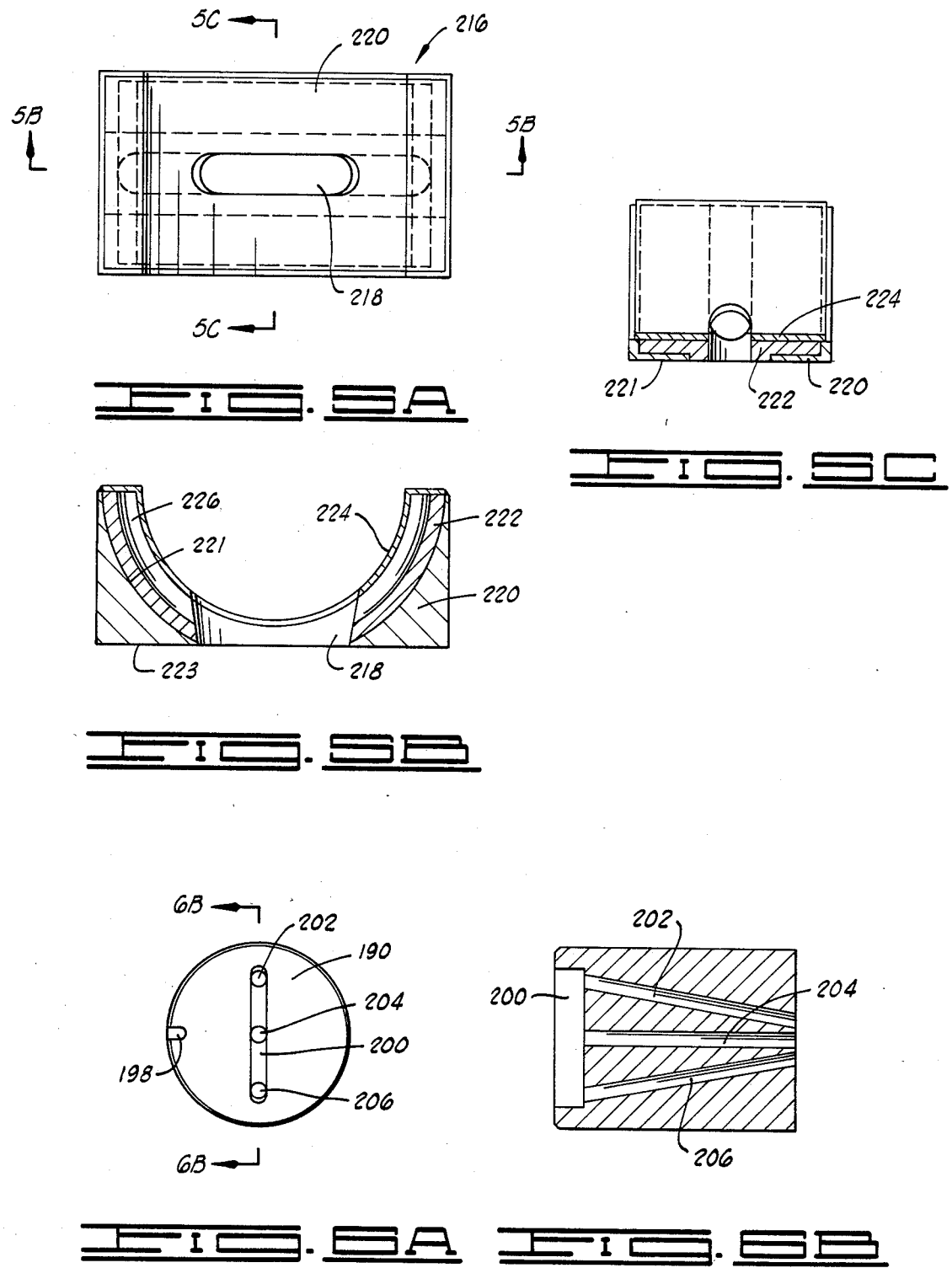

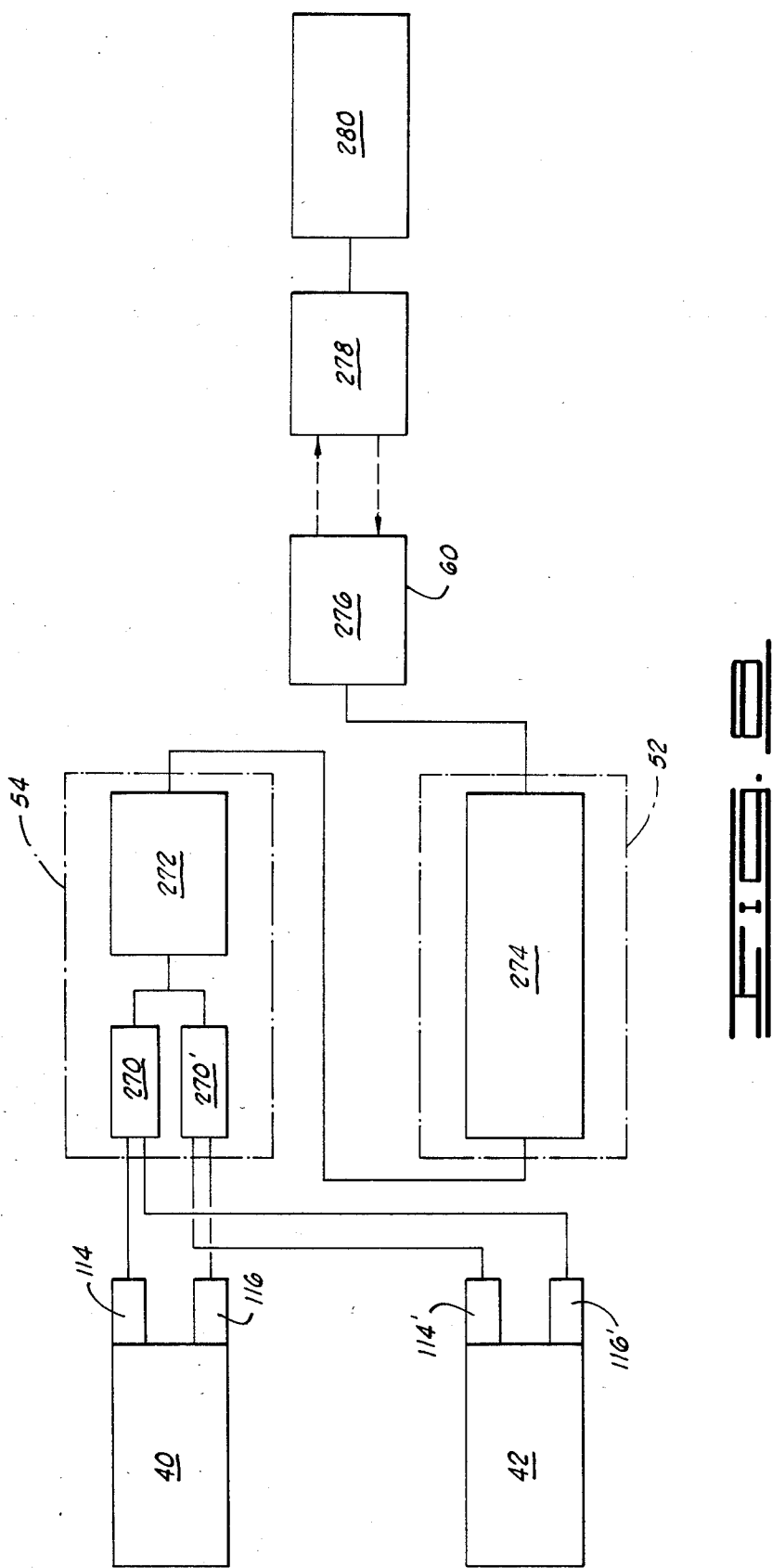

MOORING RELEASE APPARATUS AND METHOD

BACKGROUND OF THE INVENTION

The present invention relates to an apparatus and method for severing a mooring at a submerged location in response to a remote command.

It is often desired to temporarily moor vessels such as drilling ships, floating offshore drilling platforms, tankers, barges, buoys and the like in great depths of water. Such vessels are held in a substantially stationary position on the surface of the water by a length of anchor chain, cable or line attached to an anchor. In mooring in these great depths, particularly in areas of the world disposed toward the emergence of severe storms with little or no warning, it is desirable to have reliable, quickly releasable mooring systems. Typical emergency situations which require rapid movement of offshore drilling ships and platforms, in addition to the aforementioned severe weather, include well blowouts and drifting icebergs.

In the past, most mooring release mechanisms have been cumbersome to install and retrieve, unduly expensive to purchase and have required regular periodic maintenance at frequent intervals. For example, a prior art hydraulic anchor chain release mechanism which is installed beneath the anchor and anchor chain on the ocean floor is approximately 103 inches in length, 24 inches in diameter and weighs 4,400 pounds on land.

A prior art explosive cutting device for use on anchor chains, which merely comprises two shaped charges installed on an anchor chain link and detonated by explosive detonating cord, was found to be unsatisfactory in service as it required the shaped charges to extend one foot or more on each side of the anchor chain link in order to assure completer severance thereof upon detonation.

Other prior art explosive cutting devices are disclosed in U.S. Pat. No. 4,148,257, issued on Apr. 10, 1979 and assigned to Halliburton Company, Duncan, Okla. These devices generally comprise an upper member and a lower member, each having a linear shaped explosive charge therein, the members being clamped about an anchor chain link or other mooring element by a suitable fastening means, and explosive charge detonating means for each of the charges. In comparison to other prior art release mechanisms or cutters, the devices of U.S. Pat. No. 4,148,257 are relatively inexpensive, easily installed and requires relatively little maintenance. However, they are not reusable, and present several major problems in installation and operation. If the explosive cutting devices are to be installed above the water level, detonation thereof includes the ever-present possibility of flying debris which can damage the vessel or personnel unless shielding is provided. If the explosive cutting device is installed underwater but close to the hull of the vessel, the shock wave generated by shaped charge detonation may severly damage the hull. To avoid the possibility of damage, shielding is again required. Furthermore, in either of the two locations proximate the vessel one is losing most of the mooring when severance occurs. However, if the explosive cutting devices are placed further away from the vessel, the wires for detonation initiation become unwieldly to accommodate and present grave reliability and inspection problems. A remote (unwired) detonation system is impractical for these devices, as the shock wave from the explosion would destroy the required electrical components, the use of this is economically unfeasible for "one shot" use.

A prior art incendiary cutting torch for underwater use is disclosed in U.S. Pat. No. 3,713,636, issued on Jan. 30, 1973 and assigned to the United States of America. A nozzle configuration is shown which is suitable for cutting cables, chains or the like. However, no control system is disclosed which would permit remote commanded ignition of the torch. Furthermore, there is no suggestion as to how the torch would be disposed to cut a chain link to sever a mooring without the presence of an operator to move the torch as cutting proceeded.

SUMMARY OF THE INVENTION

In the contrast of the prior art, the present invention comprises a pyrotechnic mooring release apparatus and method, which may include the element of remote actuation. In the preferred embodiment, a substantially cylindrical housing is included as a structural member in a submerged portion of a mooring, such as an anchor chain. The housing divides at one end into a shackle comprising substantially parallel laterally spaced walls, each having an aperture therethrough. An element of the mooring, such as a common anchor chain link, is inserted between the walls and a shackle pin is inserted through the wall apertures and the link to secure the link to the housing. A pair of pyrotechnic cutting torches are disposed in the housing in the same plane as the link, the torch nozzles being oriented so as to sever the link on both sides of the pin when the torches are ignited, in order to release the chain therefrom. The other end of the housing comprises a clevis, secured to the anchor chain by a Kenter shackle. Torch ignition is actuated in the preferred embodiment by an electronic control system which responds to acoustically transmitted commands from a remote location, such as the deck of the moored vessel.

The compact mooring release apparatus of the present invention provides a safe and sure method of severing an anchor chain without the disadvantages inherent in the prior art. The apparatus, if used on the surface, produces no flying debris as no explosion occurs. If the apparatus is submerged near the vessel hull, no damaging shock wave is generated, again due to the absence of an explosion. The apparatus of the present invention is reusable with replacement of the cutting torches and several other, minor components, and is particularly advantageous as it may be located proximate the anchor of the mooring, actuated without physical connection to the vessel, and easily retrieved for re-use along with the vast majority of the length of the mooring. Moreover, the apparatus of the present invention requires an extremely low level of maintenance, on the order of once per year.

BRIEF DESCRIPTION OF THE DRAWINGS

The apparatus and method of the present invention will be more fully understood by those of ordinary skill in the art by reference to the following detailed description of the preferred embodiment, taken in conjunction with the accompanying drawings, wherein:

FIG. 2 is a cutaway view schematically showing the exteriors of the major components of the apparatus of the present invention in relationship to the anchor chain link to which it is secured.

FIG. 3 is a side cutaway of the housing of the present invention showing the exteriors of the major components including a cutaway of a control module and module mounting bracket to show the complete exterior of a torch module; the module containing the acoustic transducer of the control system is also shown.

FIGS. 4A and 4B are full section elevations of a cutting torch module of the apparatus of the present invention.

FIG. 5A is a frontal elevation of a nozzle assembly of the cutting torch; FIGS. 5B and 5C are sections therethrough.

FIG. 6A is an end view of a nozzle insert for the cutting torch; FIG. 6B is a section therethough.

FIG. 8 is a schematic of the control system for the apparatus of the present invention, including remote acoustic control.

DETAILED DESCRIPTION OF THE PREFERRED EMBODIMENT

Figure 1:
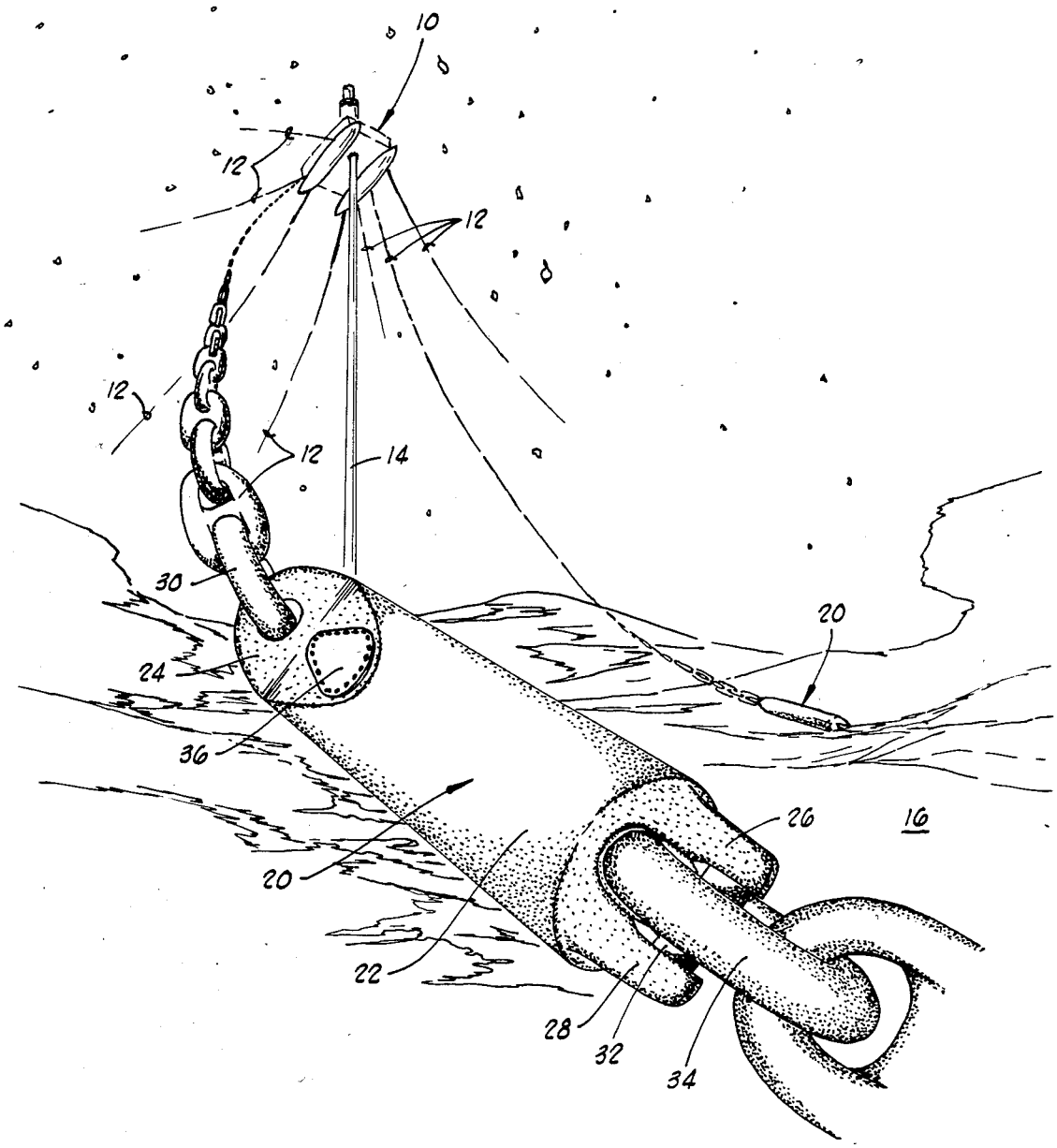
FIG. 1 is a pictorial view from the sea floor showing a floating offshore platform having a plurality of mooring chains, each of which has incorporated therein the mooring release apparatus of the present invention.

In the drawings, FIG. 1 depicts an offshore platform drilling 10 as seen from the ocean floor with a plurality of mooring chains 12 depending therefrom in a configuration designed to maintain platform 10 on station so that drilling for petroleum can be effected through conductor pipe 14. Anchors (not shown), buried in the mud of the ocean bottom 16, hold platform 10 at the desired coordinates. A mooring release apparatus 20 of the present invention is incorporated as a structural member in each of the mooring chains 12, near the anchor end of the chains. In reality, mooring release apparatus 20 may be buried under the mud on the ocean bottom, but will still operate in that condition.

As shown in FIG. 1, each mooring release apparatus comprises a substantially cylindrical cast steel housing 22, having a clevis 24 at the end connected to platform 10 (the "ship end") and a shackle comprising walls 26 and 28 at its "anchor end." Kenter shackle 30 secures clevis 24 at the ship end of the device to the rest of mooring chain 12, while shackle pin 32 is inserted through a common chain link 34 and walls 26 and 28 at the anchor end of the device. Chain link 34 and shackle pin 32 may both be referred to as "mooring elements." It should be noted that the exterior diameter of housing 22 is substantially the same as the greatest lateral extent of the mooring chain links. This feature permits easy retrieval of the mooring release apparatus 20, as it can be drawn up to just below the fairleads on platform 10 for easy access. Furthermore, the cylindrical configuration and lack of exterior protrusions on housing 22 minimizes the chances of the housing fouling the chain or the anchor. One of two acoustic window plates 36 is depicted at the ship end of the device; the acoustic "windows" open into a water-flooded transducer chamber where the acoustic transponder employed in remote actuation of mooring release apparatus 10 is located.

FIG. 2 of the drawings shows housing 22 with a substantial portion cut away, including shackle wall 26, to better depict the generally ellipsoidal cross section of shackle pin 32. Also shown are the anchor ends of torch modules 40 and 42, with nozzle assemblies 170 and 170' protruding therefrom, as well as wrap around flame guides 216 and 216'. The renderings of torch nozzle assemblies 170 and 170' and flame guides 216 and 216' are highly schematic in order to show the angular orientation and positioning thereof. In actuality, flame guides 216 and 216' abut chain link 34 and wrap around it, as is better shown in FIGS. 3, 4 and 5B, in order to concentrate the pyrotechnic cutting flame from the torch against the link. The structure of the torch nozzle assemblies and flame guides is shown in detail in FIGS. 4, 5A–5C, and 6A and 6B. Also contained within housing 22 are two cylindrical control system modules 52 and 54, the contents of which will be hereafter elaborated upon. The pyrotechnic torch modules 40 and 42 are disposed in diametric opposition to one another in the plane of link 34, while control modules 52 and 54 are disposed in diametric opposition to each other, in a plane perpendicular to link 34.

Referring now to FIG. 3, housing 22 is shown in section, with shackle wall 26 once again cut away. As is shown schematically, pyrotechnic torch modules 40 and 42 and control modules 52 and 54 are positioned in housing 22 by anchor end bracket 56 and ship end bracket 58. The details of mounting the torch, control and transducer modules are considered to be within the ability of one of ordinary skill in the art, and hence will not be discussed further. Also not shown, for purposes of clarity, are the wiring and connectors between control modules 52 and 54 and torch modules 40 and 42, as well as those connecting transducer module 60 to control module 52. These items are commerically available; a suitable wiring flow diagram is shown in FIG. 8.

As shown in FIG. 3, transducer module 60 extends into transducer chamber 64, which is water-flooded to conduct acoustic energy to the transducer module 60. Two substantially identical acoustic window plates 36 and 38 cover acoustic windows 66 and 68 cut into housing 22. Acoustic window plates may be formed of Kevlar ®, a plastic filamentary material manufactured by E. I. DuPont de Nemours & Co., by way of example and not limitation.

FIGS. 4A and 4B depict in full section, the structure of pyrotechnic torch module 40. Cylindrical front housing 70 is secured to end cap 72 by a plurality of cap screws 74, O-ring 76 forming a water-tight seal therebetween. The interior of end cap 72 possesses threaded bore wall 78, which extends outward at its rear by radially flat wall 79 into a larger bore defined by bore wall 80, which leads to radially flat end wall 82. Plug adapter assembly, denoted generally by reference numeral 84, has plug adapter 86 with threaded plug 87 at its front end, which threads into threaded bore wall 78 of end cap 72. To the rear of plug 87, front radially flat wall 88 extends outward to cylindrical sealing surface 90, having an O-ring groove (unnumbered) with O-ring 92 disposed therein. Wall 79 of end cap 72 abuts front wall 88 of plug adapter 86. Surface 90 seals against bore wall 80 of end cap 72. Sealing surface 90 terminates at radially flat wall 92, which abuts end wall 82. Outer wall 94 of plug adapter 86 is encompassed by plug holder 96 secured thereto by cap screws 98 and sealed thereagainst by O-ring 100 in a groove (unnumbered) in wall 94. At the rear of plug holder 96 are two threaded bores 102 and 104, into which connectors 106 and 108 are threaded, as seals being formed between connectors 106 and 108 and plug holder 96 by O-rings 110 and 112, respectively, disposed in annular grooves in the flanges of connectors 106 and 108.

Returning to the front end of plug adapter 86, two thermite igniters 114 and 116 are disposed in adjacent longitudinal bores, igniters 114 and 116 being contacted by igniter wires 118 and 120, the front ends of which are surrounded by teflon tubes 122 and 124, backed by heat shrink tubes 126 and 128. Axial bore 130 in which tubes 126 and 128 are disposed is filled with epoxy. Adapter chamber 132, defined by plug adapter 86 and plug holder 96, is filled with transformer oil. Ground wires 134 and 136 run from connectors 106 and 108 and ground screw 138, threaded into plug holder 96 at 140.

Tubular rear housing assembly 142 surrounds plug adapter assembly 84 and is secured thereto by cap screws 144. The rear ends of connectors 106 and 108 protrude from plug holder 96 into an open chamber defined by a pair of windows 146 cut into rear housing assembly 142, where they are connected by wires to control module 54 in a manner well known in the art. Stud 148 protruding from the rear of rear housing assembly 142 extends into ship end bracket 58 when torch module 40 is mounted in housing 22.

Moving forward in pyrotechnic torch 40, it should be noted that front housing assembly 70 contains graphite end pellet 150 having an axial frustoconical bore 152 therein leading to a smaller axial bore 154 communicating with bore 158 of intermediate graphite pellet 156. While graphite is indicated as the material of choice for components 150 and 156, it should be noted that any comparable high-temperature resistant material may be employed in these and other, later described components which are required to resist the heat generated when the torches are ignited. Again moving forward, a plurality of cylindrical pyrotechnic pellets 160 having communicating axial bores 162 therethrough are disposed along the interior of the torch front housing 70 to a point flush with front wall 164 of front housing. Disposed within axial bores 152, 154, 158 and 162 is a powdered pyrotechnic mixture 166. This is maintained in a loosely compacted state by aluminum disc 168, which covers the front outlet of axial bore 160.

Pyrotechnic pellets 160 may comprise solid, nonexplosive incendiary fuels such as are known in the art, in particular suitable fuels include those disclosed in detail in U.S. Pat. Nos. 3,503,814, issued Mar. 31, 1970 to H. H. Helms and 3,695,951 issued Oct. 3, 1972 to H. H. Helms and A. G. Rosner and 4,298,063, issued on Nov. 3, 1981 to John A. Regalbuto and Glenn B. Christopher. Generally, the pyrotechnic composition may comprise a mixture of nickel and aluminum and in addition, magnesium, ferric oxide or bismuth; nickel, a metal oxide, a component comprising aluminum and a metal selected from the group consisting of magnesium, zirconium, bismuth, beryllium, boron and mixtures thereof, and a source of gas to act as a propellant for the ignited pyrotechnic composition; or a gas forming elemental mixture of nickel, aluminum, ferric oxide and powdered polytetrafluoroethylene, wherein the latter functions to produce a gas to force the molten reaction products of the mixture out of the torch nozzle at high velocity. The latter two compositions are preferably for pellets 160, while the powdered incendiary mixture 166 may be any one of the mixtures as set forth above, but preferably without a gas-forming component, in order to assure rapid and uniform ignition of all pellets 160 in torch module 40. Upon ignition of the mixture 166 an exothermic reaction begins proximate igniters 114 and 116, which rapidly proceeds down the centerline of the torch module, igniting pellets 166 which react at a controlled rate, producing additional high temperature molten reaction products including a high pressure gas which forces the metallic molten reaction products out of the torch module and against chain link 34. It is to be emphasized that the present invention is not dependent upon or limited to the use of a particular incendiary composition, but will function adequately with any such composition that produces a jet of high temperature material of a temperature great enough to melt through the mooring chain link.

At the very front of front housing 70, nozzle assembly 170 is secured thereto by cap screws 172 tapped into annular front surface 174. Nozzle assembly 170 comprises circular graphite cap 176, having a radially flat rear wall 178, cylindrical outer wall 180, and radially flat front wall 182 having circular recess 183 centered therein. Oval bore 184 of frustoconical vertical section extends from rear wall 178 to front wall 182, widening laterally as it extends forward. Graphite cap 176 is pinned to torch nozzle 186, which together plug into the front of housing front 70, a watertight seal being effected between nozzle 186 and housing 70 by O-ring 188. Graphite nozzle insert 190 is encompassed by nozzle 186, and the circular trailing end 192 thereof mates with circular recess 183 of graphite cap 176. Pin 194 properly orients nozzle insert 190 with respect to nozzle 186, the importance of which becomes more apparent, by reference to lateral exit slot 196, machined into the interior of nozzle 190 to facilitate the breakthrough of the ignited molten pyrotechnic mixture. Referring to FIGS. 6A and 6B, nozzle insert 190 is of cylindrical configuration, with pin recess 198 at the bottom thereof as it is inserted in nozzle 186. The front of nozzle insert 190 comprises laterally extending torch 200 of substantially the same lateral extent as slot 196. Fanned bores 202, 204 and 206 extend in a lateral plane from the rear end 208 of nozzle insert 190 to torch outlet 200 at its front end, communicating with bore 184 in graphite cap 176. It should be noted on FIG. 4B that the vertical cross-section of the rear ends of bores 202, 204 and 206 enlarge to meet the outlet of bore 184.

At the front end of nozzle 186, and on each side thereof, are cap screw recesses 212 as shown on FIG. 4B, whereby cap screws 214 secure wrap-around flame guide assembly 216 to nozzle 186. Wrap-around flame guide assembly 216 is shown in more detail in FIGS. 5A, 5B and 5C. Referring to FIG. 5A, which is a rear elevational view, torch outlet slot 218 is shown, which is initially of substantially the same lateral extent as torch outlet 200, and fans out somewhat therefrom (see FIG. 5B). Wrap-around flame guide assembly 216 comprises three components, base 220 having arcuate front surface 221 and flat rear surface 223 to which cap screws 212 are secured, arcuate graphite insert 222 thereover, and arcuate cap 224 over insert 222, which protects insert 222 from breakage when torch 40 is placed in contact with chain link 34. There is an arcuate channel 226 between insert 222 and cap 224, into which the molten ignition products of the pyrotechnic mixture can flow to vaporize cap 224 and thus permit better contact of the high temperature jet with link 34.

Torch module 42 is substantially identical to torch module 40, and contains substantially the same type and number of components therein. However, while nozzle assembly 170 and flame guide assembly 216 are angled downward, nozzle assembly 170' and flame guide assembly 216' of torch module 42 are angled upward (see FIGS. 2 and 3). The angling of the nozzle assemblies and flame guide is to facilitate cutting of chain link 34 across as small a cross-section as is practicable.

Figure 7A:
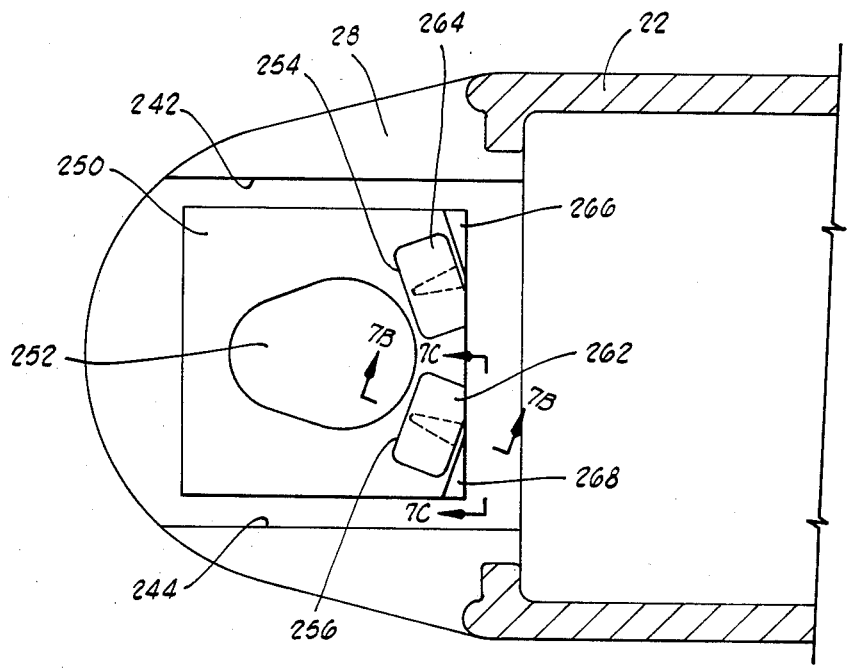
FIG. 7A is an enlarged section through the left-hand side of the housing as oriented in FIG. 3 with the chain link and shackle pin removed and showing a chain link spacer in place.
Figures 7B, 7C:
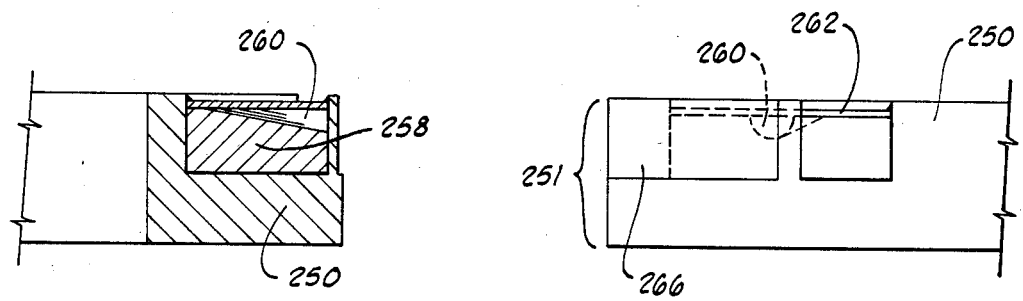
FIGS. 7B and 7C are sections therethrough showing the disposition and orientation of flame shields in the spacer.

Referring to FIG. 7A, the left-hand side of steel housing (as oriented in FIG. 3) is shown with chain link 34 and pin 32 removed therefrom. Wall 28 of the shackle is shown with recessed area 240, which is defined at its upper and lower extents by walls 242 and 244, respectively. Steel chain link spacer 250 having aperture 252 therethrough is shown in the position in which it would be held by shackle pin 32 when housing 22 and chain link 34 are secured together. Another, like spacer 250' (not shown) is placed in a recess in wall 26. Spacers 250 and 250' are of sufficient wall thickness 251 and 251' to assure that chain link 34 is firmly centered between the walls 26 and 28, in the same plane as torch modules 40 and 42. Spacer 250 and its mirror-image counterpart 250' each have a plurality of flame shield recesses, denoted at 254 and 256 on spacer 250, which are milled out thereinto and into which flame shields preferably made of graphite are inserted. As shown in FIG. 7B, flame shield 258 having frustoconical recess 260 in the outer surface thereof is disposed in flame shield recess 256. Flame shield 258 is held in place by shield cap 262, which may be spot welded into place. Shield cap 264 is disposed in flame shield recess 254 covering a second flame shield (not shown). Nozzle assembly recesses 266 and 268 are cut in the edge of spacer 250 to accommodate the positioning of nozzle assemblies 170 and 170' as flame guides 216 and 216' are positioned against chain link 34.

Referring to FIG. 8 of the drawings, torch modules 40 and 42 are shown schematically, each with two igniters 114 and 116 and 114' and 116', respectively. Control modules 52 and 54 are shown schematically in broken lines. Module 54 contains two high energy firing units 270 and 270'; each firing unit is wired as shown, to one igniter in each torch module for redundancy. Batteries and electronics for communication and torch ignition control are shown generally as 272 and 274 in control modules 52 and 54; acoustic transducer module 60 containing an acoustic transducer 276 is shown connected to control module 52, which in turn is wired to control module 54. The batteries, control electronics and transducer noted at 272, 274 and 276 may be referred to generally as transponder means. Base transponder 278 with transponder control 280 are shown with two-way acoustic communication capability (broken line arrows) with transducer 276. Base transponder 278 and transponder control 280 would normally be located on platform 10.

Igniters 114, 116, 114' and 116' are generally known as bridgewire igniters, which activate by the electrical heating of a bridgewire which in turn sets off an ignition mixture which may comprise boron and lead dioxide, for example and not by way of limitation, shooting a flame into powdered pyrotechnic mixture 166, effecting the ignition of the latter. The high energy firing units 270 and 270' each comprise a DC to DC converter, which changes low voltage DC current to high voltage DC current, which in turn charges a capacitor to a certain level controlled by an overvoltage spark gap. When this level is reached, the spark gap is bridged and the capacitor is discharged. Such firing units are commercially available from Reynolds Industries of San Ramon, Calif. The batteries contained in control module 54 which power the high energy firing units, ignition control and acoustics electronics preferably comprise 22.5 volt alkaline batteries, although lithium batteries may be employed.

An acoustic remote control system (items 278 and 280) which may be employed on platform 10 comprises the TT201 Acoustic Telecommand System with AM IXI Acoustic Module (transponder) from Oceano Instruments, U.S.A., Inc. of Seattle, Wash. This system uses frequency shift keying with a choice of over 12,000 codes for security. The transducer 276 and accompanying electronics 274 and 272 (XT 1215 Acoustic Control System) are also available from Oceano Instruments.

Briefly, the acoustic command system functions as follows. The command function employs two frequencies $F_1$ and $F_2$, which are employed to transmit an eight-bit binary coded word command, such as 1001 1100, $F_1$ being used as the carrier frequency bit "1" and $F_2$ being used for bit "0". Once the command is received, remote transducer 276 sends a reply acknowledging receipt of same. In normal operations, there are two commands necessary to activate the pyrotechnic cutting torches, the "arming" command and the "firing" command. For example, and not by way of limitation, an 8 bit coded word arming command is sent via base transponder 278 to remote transducer 276, which acknowledges receipt of the arming command, and the arming of the ignition control system with a transmission pulse. The arming command "opens" a 150 second window during which a firing command will be accepted. If the firing command is not received within this time, the control relays in the ignition control system will close until another arming command is received. If it is desired to fire after arming, a second 8 bit binary coded word firing command is sent by base transponder 278 within the firing "window" and received by remote transducer 276, which again replies, indicating that the firing command has been received and the command executed by the ignition control system. In addition to the above commands, it may be desirable to include another set of commands to enable and disable the remote transponder, to ensure that the mooring release apparatus 20 is not activated until the mooring is in place.

In operation, mooring release apparatus 20 is incorporated in each mooring chain for the vessel to be moored, the housing 22 and shackle pin 32 having as great or greater working, proof and break loads as the mooring chain of which it is a part. The mooring release apparatus 20 has an acoustic horizontal range of at least 6000 feet or more, with the mooring release apparatus 20 buried 6 feet beneath the mudline. The acoustic control system is activated when the anchor at the free end of the mooring has set, to check proper functioning of the system, by transmission of an 8 bit binary coded word command. Nothing further needs to be done by way of command transmission until the time of ignition of the torch modules 40 and 42 during an emergency mooring release.

At the time of emergency mooring release, an 8 bit arming command is sent to a mooring release apparatus 20 from platform 10, acknowledged by the former, and a second 8 bit firing command is then sent from the platform within the 150 second firing window, which command is also acknowledged from that mooring release apparatus. High-energy firing units 270 and 270' charge their capacitors with high level D current converted from low level (22.5 V) DC current to the spark gap discharge point, and discharge, heating bridgewires in igniters 114, 114′, 116 and 116′ in torch modules 40 and 42. By way of example, in torch module 40 the bridgewires in igniters 114 and 116 heat the incendiary mixture therein, which ignites and shoots a flame into pyrotechnic powder mixture 166 of torch module 40, igniting the latter mixture. This in turn ignites pellets 160, which contain a gas-forming compound in addition to the pyrotechnic mixture, as previously noted. The molten metal compounds produced by the exothermic reactions of powder 166 and pellets 160, contained in axial bore 160 of pellets 160, contact aluminum disc 168, and melt therethrough, the molten mixture being forced by the pyrotechnic mixture-generated gas into bore 184, then into fanned bores 202, 204 and 206 to torch outlet 200, and into exit slot 196, where it burns through the remaining metal thereof. Torch outlet slot 218 guides the molten mixture into arcuate channel 226, whereupon cap 224 is vaporized and the molten mixture directed against chain link 34. Of course, a similar sequence is taking place in torch module 42 at the same time. Thus, the molten reaction products of torch modules 40 and 42, driven by the pressurized gas produced therein, melt through chain link 34 on either side of pin 32, the tension in the mooring chain pulling pin 32 against the severed section of chain link 34, pulling it free therefrom and freeing the mooring chain, which can be retrieved by winches on platform 10 immediately if conditions on the surface permit. The unique arming and firing commands are given to each mooring release apparatus 20 in an order dependent on the platform operator's discretion, to permit orderly release of the platform 10 under prevailing wind and wave conditions. After retrieval, mooring release apparatus 20 may be refitted for subsequent use, by the insertion of a new shackle pin, two new torch modules and, if necessary, new chain link spacers and/or if the spacers or flame shields have sustained any damage thereto. The shackle pin should be replaced due to possible heat-induced strength loss.

Thus, it may be seen by one of ordinary skill in the art that a novel and unobvious apparatus and method for releasing a mooring chain has been invented. Of course, while the present invention has been disclosed in terms of a preferred embodiment, the invention is not so limited and additions, deletions and modifications may be made thereto without departing from the spirit and scope of the claimed invention. For example and not by way of limitation, the pyrotechnic cutting torches could be disposed in an axial plane with nozzles oriented so as to sever the shackle pin on either side of the chain link; two torches might be employed to cut the chain link at each severance point and be simultaneously or sequentially activated; two torches could be employed to sever the shackle pin and two to sever the chain link for redundancy; the torches could be offset from the chain link or shackle pin and the molten reaction products directed at the link or pin from the side; the invention may be employed in conjunction with moorings other than chain, such as looped cable; a single large torch having a plurality of nozzles to direct pyrotechnic jets against the chain link, pin, or other mooring element might be employed; the control modules might be consolidated into a single module; the acoustic transducer might be mounted exterior of the housing; an acoustic control system from another manufacturer might be employed; electromagnetic wave or low frequency radio wave signaling devices might be employed in lieu of an acoustic transponder system.

We claim:

1. A mooring release apparatus, comprising:
   a housing having clevis means at one end and shackle means at the other, said shackle means including two substantially parallel walls having apertures therethrough;
   a first mooring element comprising a shackle pin extending between said walls and through said apertures;
   a second mooring element comprising a mooring loop passing around said shackle pin;
   a plurality of pyrotechnic torch means in said housing each having a nozzle proximate said shackle pin and said mooring loop, said nozzles being oriented to direct high temperature non-explosive jets against one of said mooring elements in at least two places, the other of said mooring elements extending across the interval between said two places, and
   electronic control means in said housing, including a self-contained power source, electrical igniters for said torch means, a transducer means adapted to receive signals from a location substantially remote from said mooring release apparatus, and means to actuate said igniters in response to a said signal received from said remote location.

2. The apparatus of claim 1, wherein each of said nozzles is oriented so as to direct said jets across the substantially smallest cross sections of said mooring element proximate said nozzles.

3. The apparatus of claim 1, wherein said transducer means comprises acoustic transducer means.

4. The apparatus of claim 1, further including flame guides disposed between each torch nozzle and said mooring element against which said jets are directed.

5. A method of releasing a submerged mooring, comprising:
   providing a plurality of pyrotechnic torches having nozzles;
   orienting said torch nozzles proximate a first mooring element at locations at each end of a portion of said first mooring element across which a second mooring element extends;
   substantially simultaneously igniting said pyrotechnic torches, thereby initiating high temperature non-explosive jets from said nozzles against said first mooring element and severing said first mooring element at each end of said portion across which said second mooring element extends.

6. The method of claim 4, further comprising orienting each of said nozzles so as to direct said jets across the substantially smallest cross sections of said first mooring element proximate said nozzles.

7. The method of claim 4, wherein said substantially simultaneous ignition is effected from a location substantially remote from said torches.

8. A mooring release apparatus, comprising:
   housing means having clevis means at one end and shackle means at the other end thereof;
   mooring element means secured to said shackle means, said mooring element means including at least a severable first mooring element having a first portion, a second portion and an interval therebetween;
   pyrotechnic torch means associated with said housing means, said torch means including a first nozzle proximate to said first portion of said first mooring element and a second nozzle proximate to said second portion of said first mooring element, said first and second nozzles oriented to direct non-explosive high temperature severing jets from said torch means against said first mooring element; and ignition means associated with said torch means.

9. The apparatus of claim 8, wherein said pyrotechnic torch means further includes a flame guide between each of said nozzles and said first mooring element and adapted to substantially contain said jet against said first mooring element.

10. The apparatus of claim 8, wherein said shackle means includes a shackle comprising two substantially parallel walls having apertures therethrough, and at least part of said first mooring element is disposed between said walls.

11. The apparatus of claim 10, said mooring element means further including a second mooring element adjacent to said interval and in substantially mutually perpendicular relationship to said first mooring element.

12. The apparatus of claim 11, further comprising a plurality of spacers between said shackle means walls, said spacers adapted to substantially center one of said first and second mooring elements between said walls.

13. The apparatus of claim 8, wherein said pyrotechnic torch means comprises a plurality of torch modules each having a nozzle associated therewith, and a flame guide at the outlet of each nozzle adapted to substantially contain a high temperature non-explosive jet issuing from that nozzle against said first mooring element.

14. The apparatus of claim 8, wherein said ignition means includes electronic control means responsive to commands from a location remote from said apparatus.

15. The apparatus of claim 14, wherein said electronic control means includes a self-contained power source, electrical torch igniters, a transducer adapted to receive acoustic signals, and means to actuate said igniters in response to a said signal received from said remote location.

* * * * *